W. H. MILLSPAUGH.
PIPE THREADING MACHINE.
APPLICATION FILED DEC. 20, 1907.

994,862.

Patented June 13, 1911.
2 SHEETS—SHEET 1.

WITNESSES

INVENTOR
William H. Millspaugh
By Julian C. Dowell
his Attorneys

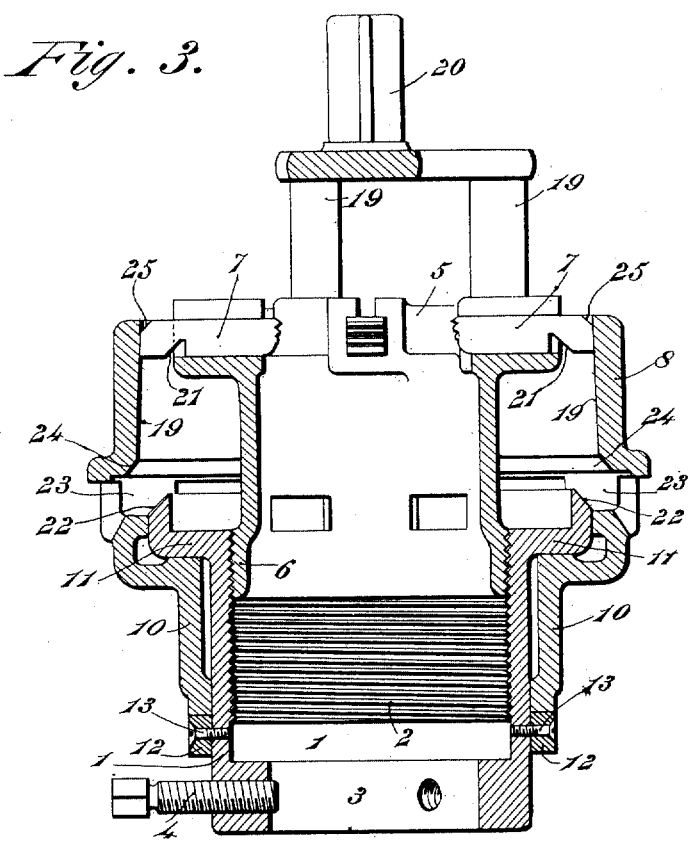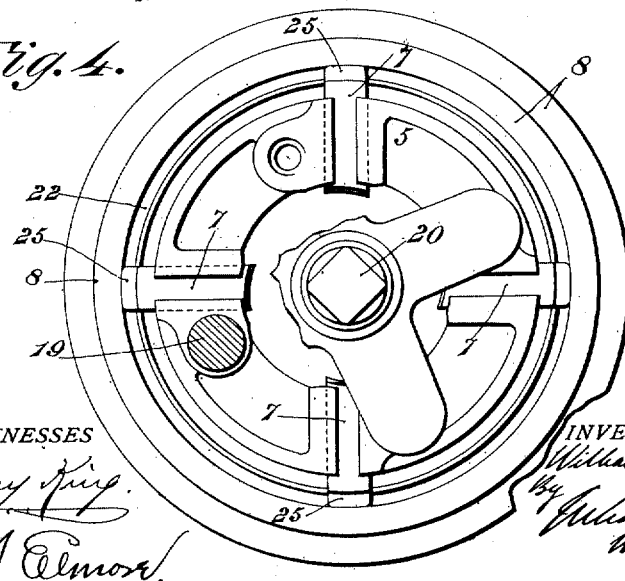

UNITED STATES PATENT OFFICE.

WILLIAM H. MILLSPAUGH, OF SANDUSKY, OHIO, ASSIGNOR TO THE SANDUSKY FOUNDRY & MACHINE COMPANY, OF SANDUSKY, OHIO, A CORPORATION OF OHIO.

PIPE-THREADING MACHINE.

994,862.  Specification of Letters Patent.  Patented June 13, 1911.

Application filed December 20, 1907. Serial No. 407,371.

*To all whom it may concern:*

Be it known that I, WILLIAM H. MILLSPAUGH, a citizen of the United States, residing at Sandusky, in the county of Erie and State of Ohio, have invented certain new and useful Improvements in Pipe-Threading Machines; and I do hereby declare the following to be a full, clear, and exact description of the invention, such as will enable others skilled in the art to which it appertains to make and use the same.

The object of this invention is to improve and simplify the construction of pipe or rod threading machines designed for cutting a tapered thread, and particularly to lessen the number of essential parts and bearing surfaces which require machining or milling, and to thereby reduce the cost of production of machines of the character stated. The attainment of these objects is effectuated by so constructing the machine as to utilize only an essential element thereof, namely, the outer shell or casing which incloses the die-carrying-head, to provide for all the radially-adjustable dies a single tapered or conoidal abutment surface, which contacts with and is traversed by the backs or outer ends of the dies, as the latter advance on the work, thereby permitting the gradual recession of the dies as required to cut a tapered thread.

The invention will be described by reference to the accompanying drawings, which form a part of this specification, and then more particularly pointed out in the appended claims.

Figure 1:
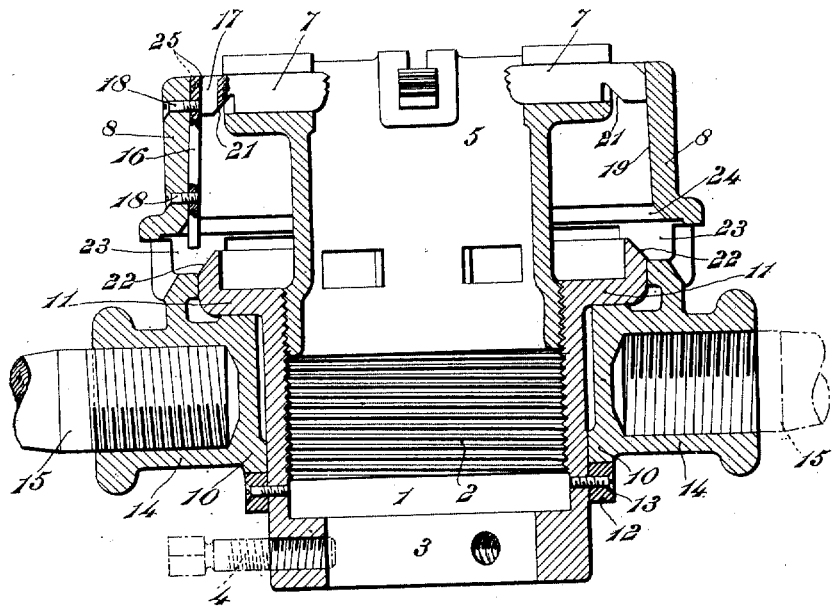
Figure 2:
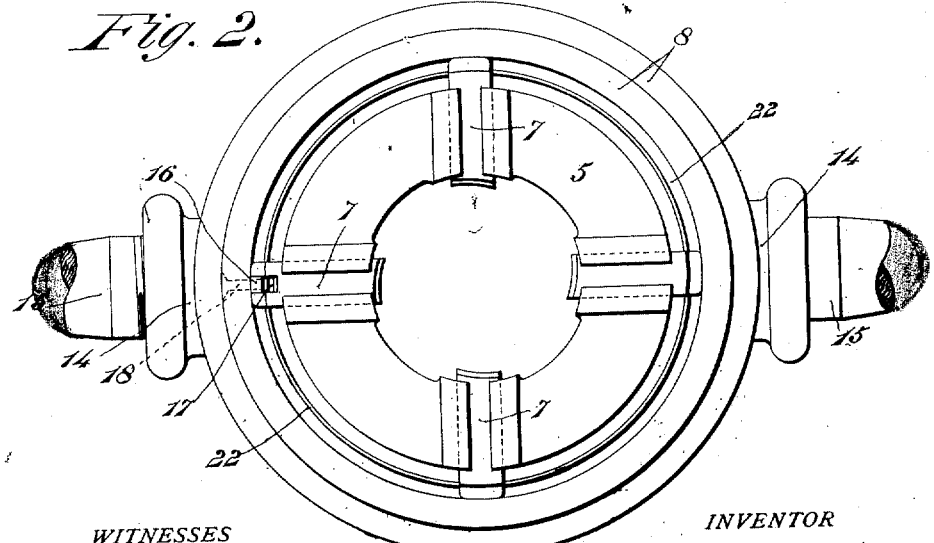

In said drawings, Figure 1 is a central longitudinal section of one form of threading machine embodying my invention. Fig. 2 is a front elevation of the same, or a plan view of Fig. 1. Fig. 3 is a central longitudinal section of another form of machine embodying my invention. Fig. 4 is a front elevation thereof, or plan view of Fig. 3.

The two machines illustrated respectively on sheets numbers 1 and 2 of the drawings are substantially similar in general construction and principle, so that the same general description will apply to both. The main difference between the two machines resides in the means of operating or driving the die-carrying-head, as will appear later.

As shown in the drawings, 1 denotes a tubular work-holder, having a tubular lead-screw 2, and in the contracted neck 3 of which the pipe, rod or other work to be threaded may be centered and clamped by set-screws 4 in the usual manner.

The numeral 5 denotes the die-stock or head, having an extending tubular feed-screw 6 which engages the lead-screw 2 in the work-holder, whereby the die-head is advanced axially as it is revolved. Said die-head carries a series of radially-movable thread-cutting dies or chasers 7, slidable in slots or ways therefor in the die-head, the inner ends of the dies being formed with screw-cutting bits for engaging the work, while the outer ends or backs of the dies project outwardly beyond the perimeter of the die-head. Surrounding the die-head is an outer casing or shell 8, whose interior surface 9 is conoidal or conical, and provides for all the dies a tapered abutment which is traversed by the backs of the dies as the latter are advanced by axial progression of the die-head, allowing the dies to gradually recede as required to produce a tapered-cut, the degree and inclination of the tapered or conical surface 9 being in accordance with the taper desired for the thread which is to be cut. Said shell or casing 8 is revolubly mounted on or swiveled to the work-holder, and for this purpose, in the illustrated construction, the said shell or casing is shown having a reduced tubular extension 10, which latter is journaled on or loosely encircles the tubular work-holder and is held against axial displacement between the flange 11 on the front or upper end of the work-holder and a removable ring or collar 12, the latter being secured by screws 13 or otherwise. Obviously, various other ways of swiveling the shell to the work-holder may be substituted. According to the illustrated construction, the machine is assembled by slipping the shell or casing 8 over the work-holder, from the smaller end of the latter, and then securing the collar 12 in place, while the die-head may be assembled either before or after.

In the construction shown in Figs. 1 and 2, the die-head is revolved indirectly by turning the outer shell or case 8, for which purpose the reduced portion 10 of the latter is shown having laterally threaded sockets 14 to receive radially projecting handles 15. When the shell or casing is revolved by means of said handles, the rotary motion is or may be transmitted to the die-head by any suitable key-and-groove connection, to permit the die-head to advance axially relative to the shell while yet turning with the latter. The specific means shown for this purpose comprises a key or spline 16 attached longitudinally on the inner surface of the shell 8 and working in a slot or notch 17 in one of the dies. In operation, the parts being in the position shown in Fig. 1, and the pipe or other work to be threaded being fixed in the work-holder, the shell or casing 8 is revolved by the handles 15, imparting rotary motion to the die-head 5 through the spline and groove connection 16, 17, and in revolving the die-head is of course advanced axially or longitudinally with relation to the work-holder and outer shell or casing, thus causing the dies to properly thread the work; and as the action progresses the backs of the dies passing along the conical surface 9 will allow the dies to gradually recede, imparting a corresponding taper to the thread, in a well known manner. Inasmuch as repeated operations tend to cause wear of the paths traversed by the dies on the surface 9, provision may be made for angular adjustment of the shell or casing 8 relative to the die-head, so as to bring fresh portions of the conical surface 9 into play. This may be effected either by attaching a plurality of splines 16 at intervals in the shell or casing, so as to engage the notch 17 with different splines; or by providing the casing at suitable intervals with screw-holes to permit shifting and attaching at different positions a single spline, which may secured by screws 18.

In the device shown in Figs. 3 and 4, the die-head is revolved directly, and for this purpose the die-head is provided with a forwardly or upwardly projecting spider 19, adapted in operation to straddle the pipe as the work progresses; said spider having an axial or central stem 20 which is made square or angular to receive a wrench, crank, lever, or other turning instrumentality. When the power is thus directly applied to the die-stock, the resistance of the work against the dies and consequently pressure of the backs of the dies upon the surface 9, will cause the shell or casing 8 to revolve with the dies, while allowing the latter to traverse the conical surface in an axial or longitudinal direction; but when not in operation, the casing or shell 8 may be freely turned relative to the dies to present fresh or unworn surfaces to the backs of the dies; and at completion of each threading operation, when the die-stock is turned back or reversed to begin a new operation, the dies will start on new paths on the surface 9.

Incorporated in both of the illustrated machines are means for automatically retracting and resetting the dies. At the completion of each threading operation, or rather as the die-head reaches the limit of its positive feed movement, bevels 21 made by an under-cut in the dies engage an annular bevel 22 formed on a shoulder on the flange 11. By coaction of the bevels 21 and 22, the dies will be automatically retracted from the work, thus releasing the latter, the backs of the dies being received in an annular recess 23 in the outer shell or casing 8. The work having been released, when the die-head is reversed for turning it back to starting position, an annular bevel 24 at the inner or lower end of the conical surface 9 will coact with bevels 25 on the upper sides of the dies, and thus automatically reset them to operative position.

From the foregoing, it is apparent that I have produced a simplified form of machine embodying a minimum number of essential parts, and have consequently reduced the cost of producing the machine as a whole, by avoiding the expense incident to casting and machining a multiplicity of parts, and this without in any wise impairing the machine's efficiency in operation. It is noted that the outer casing or shell 8 of the machine provides the conical surface 9, which affords the bearing or abutment for all the dies, and this conical surface can be readily milled or turned accurately in a lathe, thus insuring accuracy in the centering of the dies. This conical bearing surface 9, formed on an essential element of the machine, is the only surface which needs to be accurately machined.

I do not intend to restrict myself to any specific machine or machines, since obviously various modifications may be made in detail. For example, the invention is not dependent upon any particular form of work-holder and die-head, nor upon any particular means of swiveling the outer shell or casing to the work-holder, nor upon any particular connection between the work-holder and die-head for feeding the latter, although the interengaging male and female threads are shown as the construction ordinarily preferred in this class of machines. It should be also mentioned that the term "revoluble" is used only in a relative sense since the same effect may be had whether the die-head or work is revolved. So also, the term "radially" is not intended as restrictive, but includes a construction where the dies may be arranged more or less obliquely to strictly radial lines.

Having thus described my invention, what I claim as new and desire to secure by Letters Patent is:

1. In a pipe-threading machine, the combination of a work-holder and a die-carrying head having a screw-connection whereby they are caused to approach each other when one is revolved, radially-movable cutting-tools or dies carried by said head, the backs of the dies projecting beyond the perimeter of said head, and an outer shell or casing inclosing said die-carrying head and having a tubular extension swiveled to said work-holder, there being an annular space or clearance between said outer shell or casing and said head, and the said outer shell or casing being interiorly turned on a taper and thereby providing for all the dies a single conoidal abutment surface which contacts with and is traversed by the backs of the dies in carrying out the thread-cutting operation, allowing a gradual radial adjustment of the dies as required to cut a tapered screw.

2. In a thread-cutting machine, the combination of a tubular work-holder provided with a female lead-screw, a die-carrying head having an extending tubular male feed-screw engaging said lead-screw, the work-holder having an outer flange at its front and a detachable collar behind said flange, and an outer shell or casing inclosing said die-carrying head and having a contracted tubular extension rotatably-mounted on said work-holder and secured against axial displacement between said flange and collar, said outer shell or casing having its interior surface conical for direct contact with the rear or outer ends of radially-movable dies carried by said die-carrying head.

3. In a thread-cutting machine, the combination of a revoluble die-carrying head, an encircling revoluble shell having an interior tapered surface, said shell constituting the outer casing of the machine, a radially-movable die carried by said head and whose back or outer end abuts against said tapered surface, a spline-and-groove connection between said die carrying head and shell whereby the shell and die-carrying head are caused to revolve together while permitting axial advance of said head, and means whereby said head is axially advanced relative to said shell when one of them is revolved.

In testimony whereof I affix my signature, in presence of two witnesses.

WILLIAM H. MILLSPAUGH.

Witnesses:
A. L. ROBBINS,
H. R. FARNSWORTH.

---

Copies of this patent may be obtained for five cents each, by addressing the "Commissioner of Patents, Washington, D. C."